(12) United States Patent
Yanagimachi et al.

(10) Patent No.: US 7,887,744 B2
(45) Date of Patent: Feb. 15, 2011

(54) METHOD OF INJECTION STRETCH BLOW MOLDING HEATPROOF BOTTLES

(75) Inventors: Yukio Yanagimachi, Nagano-ken (JP); Nobuhiko Nakazawa, Nagano-ken (JP)

(73) Assignee: A. K. Technical Laboratory, Inc., Nagano-ken (JP)

( * ) Notice: Subject to any disclaimer, the term of this patent is extended or adjusted under 35 U.S.C. 154(b) by 0 days.

(21) Appl. No.: 12/151,471

(22) Filed: May 7, 2008

(65) Prior Publication Data

US 2008/0277840 A1    Nov. 13, 2008

(30) Foreign Application Priority Data

May 8, 2007    (JP) .............................. 2007-123485

(51) Int. Cl.
*B29C 49/16*    (2006.01)
(52) U.S. Cl. ...................................... 264/530; 264/519
(58) Field of Classification Search ......... 264/519–521, 264/529–530, 905–906
See application file for complete search history.

(56) References Cited

U.S. PATENT DOCUMENTS

| | | | |
|---|---|---|---|
| 4,603,066 A * | 7/1986 | Jabarin ..................... | 428/36.92 |
| 4,726,756 A | 2/1988 | Aoki | |
| 4,741,688 A | 5/1988 | Aoki | |
| 5,013,515 A | 5/1991 | Aoki | |
| 5,364,585 A | 11/1994 | Takeuchi | |
| 5,589,130 A | 12/1996 | Takada et al. | |
| 6,159,416 A * | 12/2000 | Kawakami et al. .......... | 264/531 |
| 2003/0001317 A1* | 1/2003 | Stafford et al. .............. | 264/532 |

FOREIGN PATENT DOCUMENTS

| | | |
|---|---|---|
| JP | 58-194521 A | 11/1983 |
| JP | 58-208020 A | 12/1983 |
| JP | 60-247541 A | 12/1985 |
| JP | 2902119 B | 3/1999 |

* cited by examiner

*Primary Examiner*—Christina Johnson
*Assistant Examiner*—Xue Liu
(74) *Attorney, Agent, or Firm*—Weingarten, Schurgin, Gagnebin & Lebovici LLP

(57) ABSTRACT

A preform of injection-molded PET has a body wall thickness of 3.0-4.5 mm. The preform is high-temperature mold-released from an injection cavity mold and an injection core. Pre-blowing of the preform is restricted at 5±0.5 seconds after the mold release, at a temperature of 112-117° C. of the pre-blow mold, and for a pre-blowing time of 0.5-1.0 second. Air blowing is applied to expand only the body of the preform. Stretch blow molding is performed restrictively at 3-4 seconds after the mold release from the pre-blow mold, at a temperature of 103-107° C. of the blow mold, and for an air blowing time of 6-9 seconds, thereby stretch blow molding the preform into a bottle and simultaneously heat setting to impart heat resistance to the bottle.

2 Claims, 8 Drawing Sheets

(Body Wall Thickness 3.5 mm)

(Body Wall Thickness 4.2 mm)

(Body Wall Thickness 3.5 mm)

METHOD OF INJECTION STRETCH BLOW MOLDING HEATPROOF BOTTLES

This application claims priority to Japanese application No. 2007-123485 filed May 8, 2007.

BACKGROUND OF THE INVENTION

1. Field of the Invention

The present invention relates to a method of injection stretch blow molding, which comprises pre-blowing an injection-molded preform of polyethylene terephthalate (PET) and then stretch blow molding it into a bottle in a blow mold to impart heat resistance to the bottle in the same blow mold.

2. Description of the Related Art

Methods of molding PET bottles include a method of injection stretch blow molding, which is referred to as the so-called hot parison system. It comprises quenching a preform to a temperature below the glass transition point at the time of injection molding; releasing the preform from an injection mold and an injection core while surface layers inside and outside the body of the preform are semi-cured as a result of the quenching time and temperature and the inside is still at a higher temperature; and stretch blow molding the preform before the surface temperature of the preform reaches the peak temperature, thereby molding a bottle with a thin wall body.

The hot parison system may include a means for molding heatproof bottles, which comprises transferring a high-temperature mold-released preform in an injection station to a temperature regulating station; transferring the temperature-regulated preform to an stretch blow molding station; stretch blow molding a hollow molded product (bottle); transferring the bottle to a secondary processing station; and blowing high-temperature air into the bottle for heat treatment in a heat treatment mold.

A temperature regulating means may be achieved through a method, which comprises housing a high-temperature mold-released preform in a cooler temperature regulating mold; and expanding only a body of the preform by pre-blowing to uniform the wall thickness and temperature of the body. Another temperature regulating means comprises providing a temperature regulating mold and a blow mold in parallel; shifting both the molds alternately relative to the preform to perform adjustment of the preform by pre-blowing and stretch blow molding of the bottle.

| [Patent Document 1] | JP 2902119 B |
| [Patent Document 2] | JP 60-247541A |
| [Patent Document 3] | JP 58-208020A |
| [Patent Document 4] | JP 58-194521A |

In the above hot parison system, the injection-molded preform is released from the injection mold and the injection core while surface layers inside and outside the body of the preform are semi-cured and the inside is still at a higher temperature. Accordingly, there is an extremely uneven difference in temperature between the inner center of the body of the preform and the surface thereof as graphed in FIG. 9. In addition, temperature distributions across the body in section exhibit mountain shapes with high-temperature inner portions as shown in FIG. 10. FIGS. 9 and 10 show measured surface temperatures and inner temperatures simulated from the measured surface temperatures. In such the body temperatures, the inner temperature descends as heat radiation from the surface with the passage of time reduces the inner thermal energy. In contrast, the surface temperature ascends as the surface layer is heated from inside. This relative temperature variation reduces the temperature difference and the temperature distribution also varies from a higher mountain shape t1 to a lower mountain shape t2 and to a much easier hill shape t3 to achieve evenness. The time for achieving a temperature balance is longer, however, and a certain temperature difference is retained even after the surface temperature reaches the peak temperature.

In stretch blow molding before the outer surface temperature of the preform reaches the peak temperature, temperatures inside and outside the body are uneven and the temperature difference causes differences in crystal density in the lateral section of the body of the molded bottle. In this case, the crystal density is higher in the surface layer which is lower in temperature than the inner center and is located in the crystal temperature region. Therefore, the surface layer is advantageous to provide a good quality bottle, excellent in surface brightness and drop strength. The drop strength of the bottle can be improved as the thickness of the surface layer is increased. In this case, the increase in surface layer thickness results in a reduced high-temperature region at the inner center and a lowered amount of accumulated heat. Accordingly, formation of the surface layer by cooling has a limit. In addition, the distribution of crystal densities may make it easy to peel off the surface layer. Therefore, a temperature regulating means is applied to evenly adjust the inner and outer temperatures of the body of the preform.

The stretch blow molded bottle by the hot parison system is lower in crystal density than that by a cold parison system and has a problem in heatproof processing because of the uneven distribution of densities. Therefore, the high-temperature mold-released preform is adjusted evenly and then stretch blow-molded into a bottle. Thereafter, the bottle is heat-treated into a heatproof bottle. Therefore, in the hot parison system, molding of the heatproof bottle requires a longer time and the molded bottle is heatproof processed in a secondary processing. Accordingly, it has problems associated with poor yields and higher costs.

SUMMARY OF THE INVENTION

The invention is aimed at solving the problems on molding of heatproof bottles in the above stretch blow molding techniques and has an object to provide a novel method of injection stretch blow molding heatproof bottles. This method is capable of both stretch blow molding and heat setting of a bottle in a blow mold. This is achieved by applying a pre-blow molding means to temporarily suppress radiation of heat from a body surface of a preform to preserve heat accumulated in the inside and retain a higher body temperature of the preform until stretch blow molding of the bottle.

In accordance with the above object, the present invention provides a method of injection stretch blow molding of heatproof bottles, comprising: forming by injection molding a bottomed preform having a bottom by charging polyethylene terephthalate into an injection mold composed of an injection cavity mold and an injection core with polyethylene terephthalate; quenching the preform to a temperature below the glass transition point at the time of injection molding; releasing the preform as a hollow preform from both the injection mold and the injection core while surface layers inside and outside the body of the preform are semi-cured and the inside is still at a higher temperature in association with the cooling temperature and time thereof; putting the mold-released hollow preform into a cavity in a pre-blow mold and expanding the hollow preform by pre-blowing air blowing for pre-blowing to adjust the its wall thickness and temperature of the body of the preform to provide a hollow adjusted preform; releasing the hollow adjusted preform from the pre-blow mold and transferring the hollow adjusted preform to a blow mold for bottle molding; and stretch blow molding the hollow adjusted preform within a blow cavity in the blow mold by extending an stretch rod to stretch the preform and blowing air into the blow mold cavity to form a heatproof bottle from the preform with a thinner body, wherein the body wall thickness of the preform as stretch blow molded is limited to within a range of 3.0-4.5 mm, wherein the adjustment of the hollow preform by the pre-blowing of air is performed by expanding only the body restrictively at a time of 5±0.5 seconds after release from the injection mold release, at a temperature of 110-117° C. in the pre-blow mold, and for a pre-blowing time period of 0.5-1.0 second, wherein the stretch blow molding of the bottle is performed by stretch blow molding the adjusted hollow preform into the bottle form, immediately followed by heat setting the body and the bottom with the blow mold to impart heat resistance to the bottle restrictively at 3-4 seconds after the release from the pre-blow mold, at a temperature of 103-107° C. in the blow mold, and for an air blowing time of 6-9 seconds.

The pre-blow mold comprises split molds (mold sections) and includes a pre-blow cavity having a diameter 0.5-2.75 mm larger than the outer diameter of the preform body, forming a gap between preform and mold. The preform inside the pre-blow cavity is expanded by air blowing through the gap to reduce the eccentricity of the wall thickness of the preform body. Radiation of heat from the outer surface of the preform body is suppressed for 0.5 to 1.0 seconds by air-pressing the body of the preform against the pre-blow cavity surface.

The pre-blowing is performed by blowing low-pressure air of 1.4-1.7 MPa, and the stretch blow molding is performed by blowing high-pressure air of 2.5-3.5 MPa.

The invention makes it possible to temporarily suppress radiation of heat from a preform by pre-blowing and retain a higher body temperature until stretch blow molding. Accordingly, even in stretch blow molding by the hot parison system, a preform can be both stretch blow molded and the bottle be heat set at the same time, efficiently. Thus, it is possible to mold a heatproof bottle in a shorter time than the method of transferring a molded bottle to another site for heat setting as a secondary processing. In addition, as transferring a bottle is not required, it is possible to prevent a failed product from occurring, which may likely occur during a transition to heat setting, and achieve a reduced production cost together with the improvement in molding efficiency.

DETAILED DESCRIPTION OF THE EMBODIMENTS

FIGS. 1-5 show an example of a mold device for use in injection stretch blow molding of heatproof bottles according to the invention.

Figure 1:
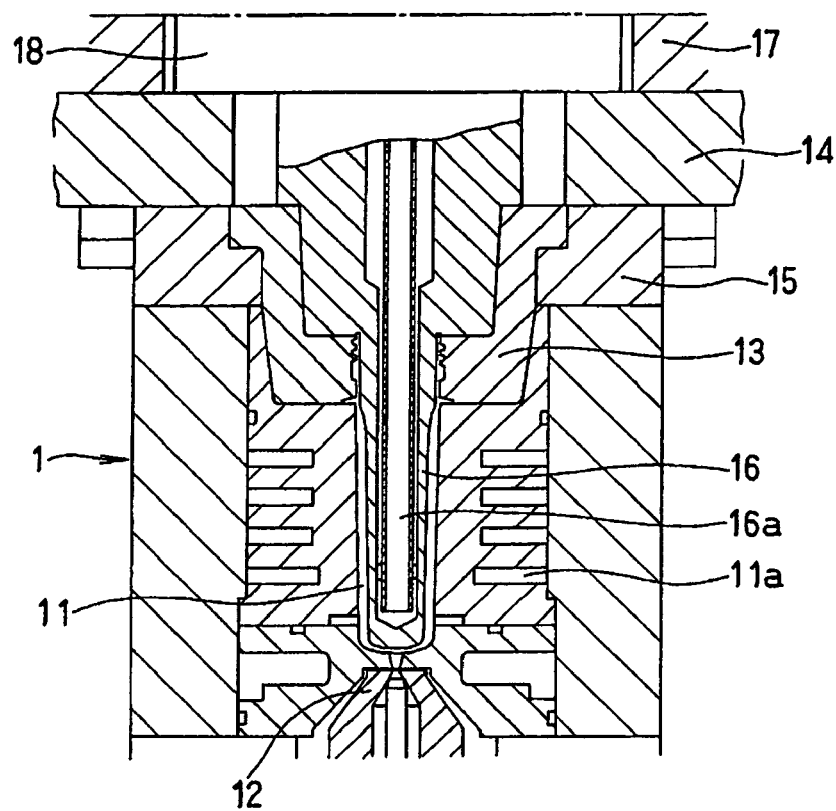
FIG. 1 is a vertical cross-sectional view of an injection cavity mold and an injection core on mold fastening.
Figure 2:
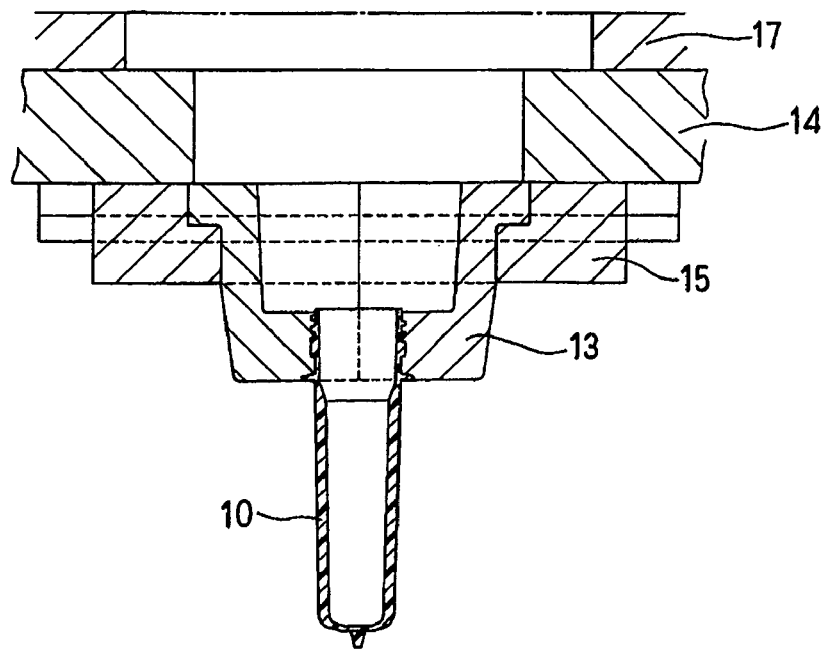
FIG. 2 is a vertical cross-sectional view of a neck mold and a preform in a mold-released state.

With reference to FIGS. 1 and 2 there is shown an injection mold for a preform 10 having sides and a bottom located on an operating unit for injection molding. The injection mold includes a cooling water path 11a in an injection cavity mold 1 which surrounds a cavity 11. An injection nozzle 12 is located on the bottom. The injection mold 1 has an upper end of cavity 11 which is recessed such that a neck mold 13 for molding a neck of the preform 10 is fitted therein. The neck mold 13 is provided with a pair of left and right support frame members 15 which allow opening and closing. These are attached to a lower side of a transfer plate 14. The transfer plate 14 is provided in an intermittently rotatable arrangement on a lower surface of a lift board 17.

The reference numeral 16 denotes an injection mold inner core for molding an inner surface of the preform 10. The injection core 16 is attached downward to a lower surface of a mold fastener block 18 provided movable up/down on the lift board 17 and includes a cooling water path 16a formed therein. The transfer plate 14 descends together with the lift board 17 so that the injection mold 1 and the neck mold 13 are closed. Almost at the same time or after mold closing, the injection core 16 descends together with the mold fastener block 18. The injection core is thus inserted via a bore formed through the transfer plate 14, through the neck mold 13, into the injection cavity mold to form the cavity 11 below the cavity surface for injection molding the bottomed preform 10.

Figure 3:
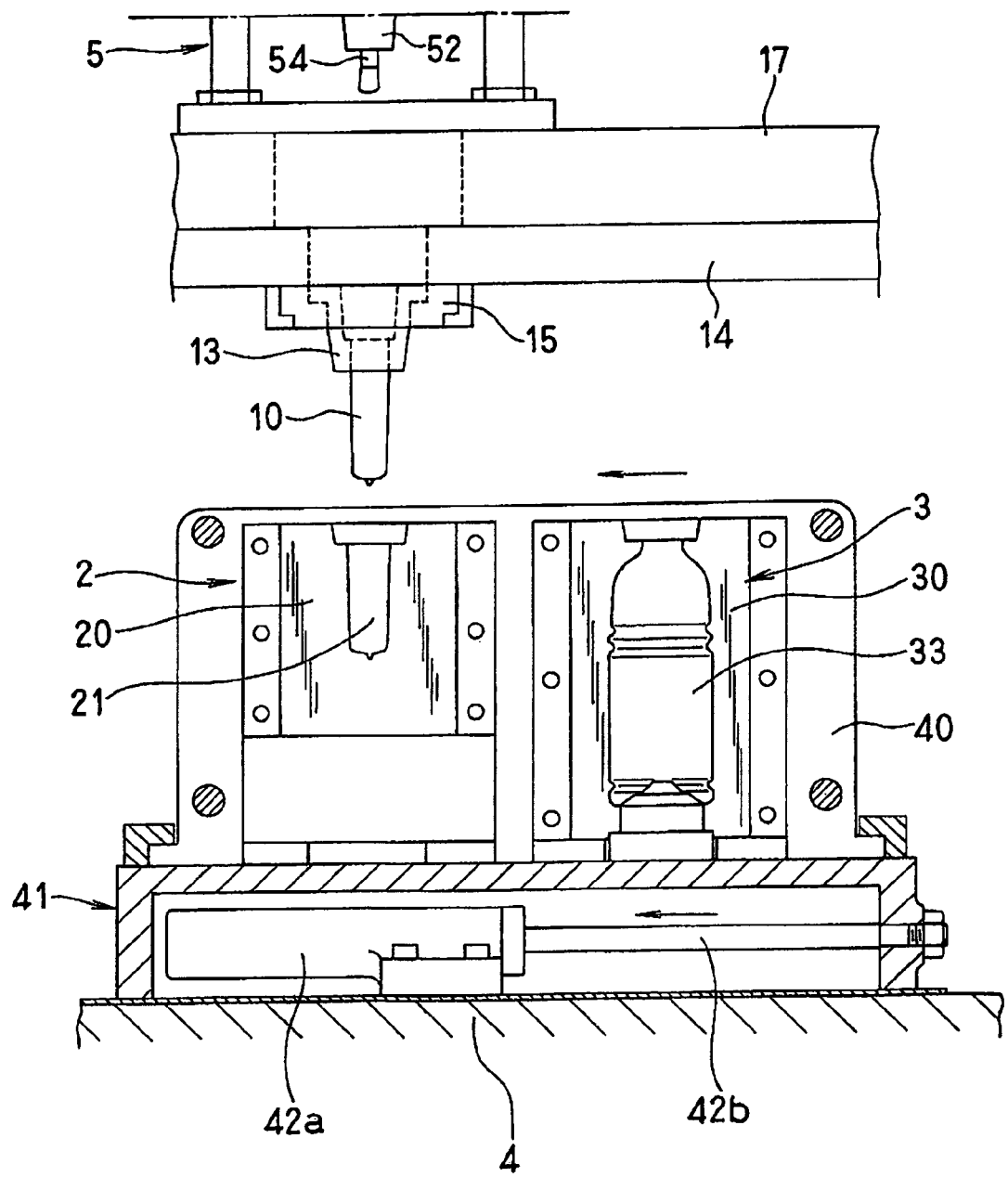
FIG. 3 is a vertical cross-sectional view of a pre-blow mold and a blow mold arranged in parallel on a seat.

FIG. 3 shows a pre-blow mold 2 for the preform 10 and a blow mold 3 for bottle molding arranged on an operating unit for stretch blow molding. Both molds are arranged in parallel and attached to a pair of mold fastening plates 40 provided on a seat 41 arranged capable of reciprocating on a board 4. The mold fastening plates 40 open and close both molds 2 and 3 simultaneously. A shifter is provided for horizontal movement of a seat 41 supporting plates 40. The shifter includes an oil hydraulic cylinder 42a extending in a direction of movement of both molds and fixed to the board 4, and a piston 42b having a tip fixedly attached to a sidewall of the seat 41. As the piston 42b telescopes, both molds move together with the seat 41 relative to the preform 10.

In the above mold device, the pre-blow mold 2 and the blow mold 3 are arranged in parallel on the same seat 41 so that the lateral movement of the seat 41 can shift the blow mold 3 to the position of the pre-blow mold 2. As a result, mold exchange can be achieved without shifting the preform 10 held in the neck mold 13. Accordingly, a shift from pre-blowing to blow molding can be completed in a short time.

Figure 4:
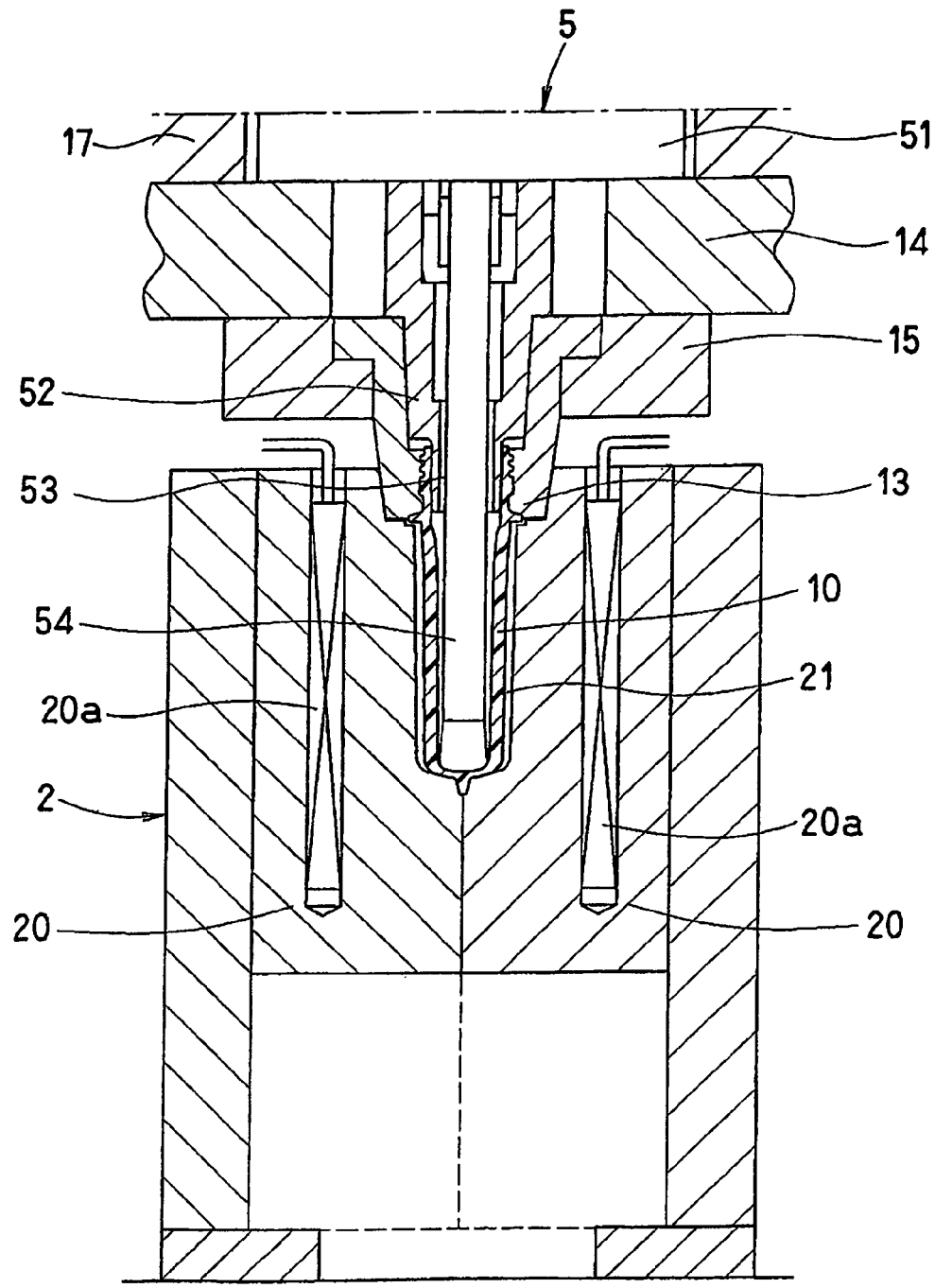
FIG. 4 is a vertical cross-sectional view of the pre-blow mold and the neck mold with the preform in a mold-fastened state.

FIG. 4 shows an example of the pre-blow mold 2, which comprises a pair of mold sections 20, 20 attached to opposite surfaces of the pair of mold fastening plates 40 which are laterally moved to open and close the pair of mold sections 20. A recess is formed in the upper end of sections 20 at the center such that the neck mold 13 fits therein. Closing the mold sections 20, 20 forms a pre-blow cavity 21 that accommodates the body of the preform 10 therein. The pre-blow cavity 21 has the same height as the height of the preform 10 and a diameter 0.5-2.75 mm larger than the preform body diameter. The cavity causes a gap of 0.25-1.375 mm between the performed body 10 outer surface and the cavity 21 surface. The mold sections contain heat pipes 20a.

Figure 5:
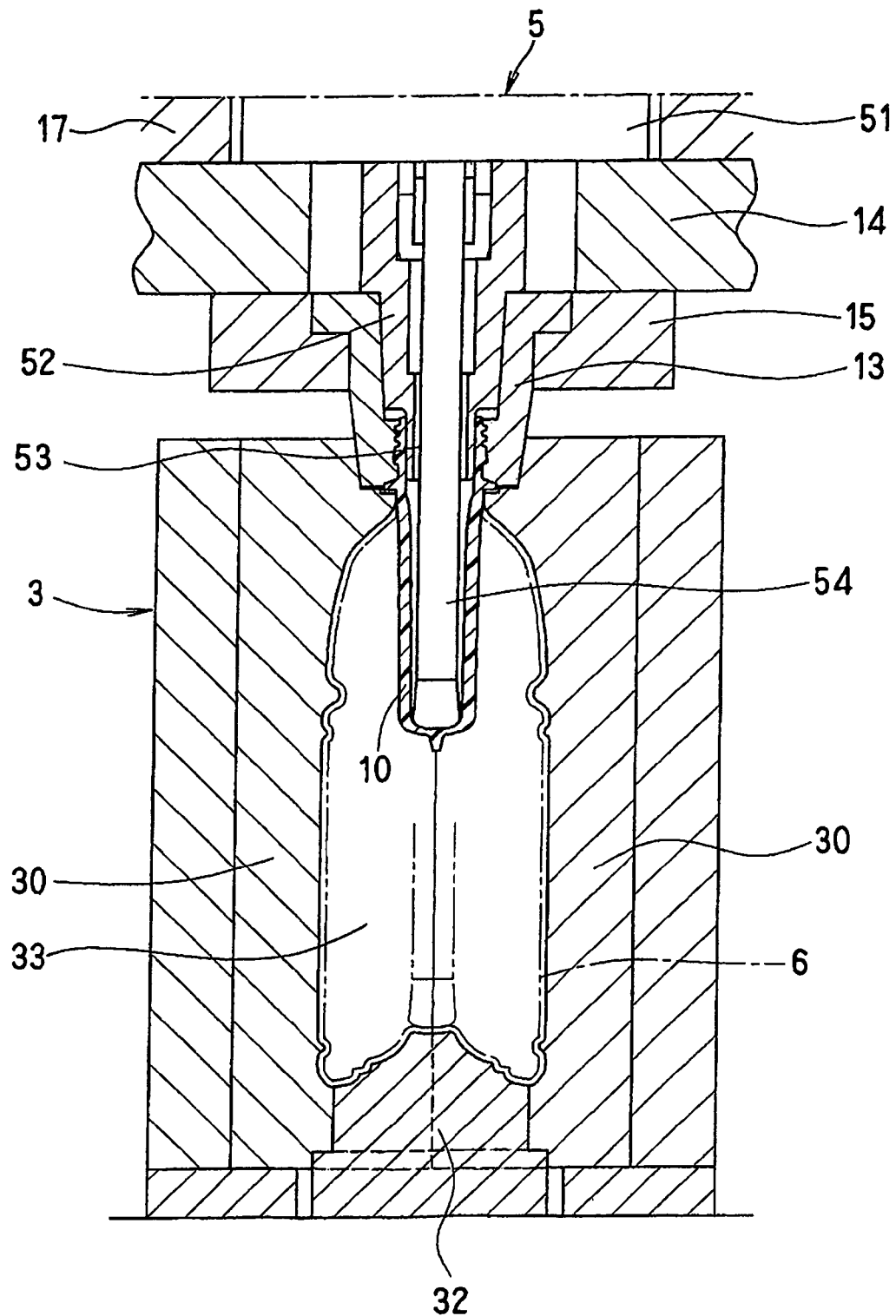
FIG. 5 is a vertical cross-sectional view of the pre-blow mold and the neck mold with an adjusted preform in a mold-fastened state.
Figure 6:
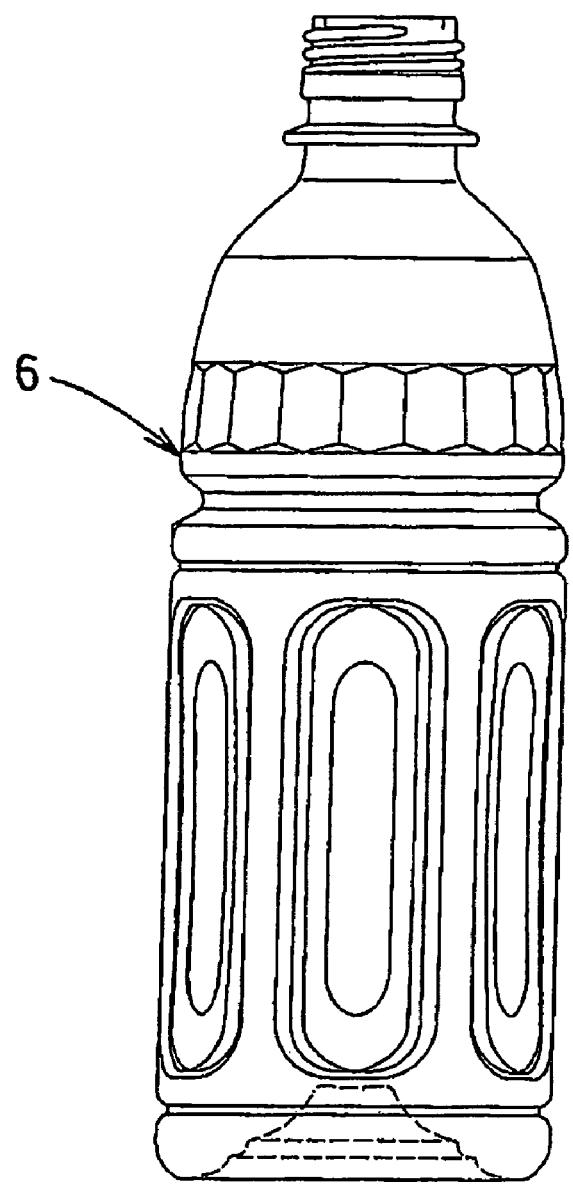
FIG. 6 is a front view of a bottle.

FIG. 5 shows an example of the blow mold 3, which comprises a pair of mold sections 30, 30 attached to opposite surfaces of the pair of mold fastening plates 40 which provide lateral open and close movement. A bottom mold section 32 closes blow cavity 33 at the bottom center. A recess is formed in the upper end at the center such that the neck mold 13 fits therein. The normal blow mold 3 is provided with a heating means, not shown in the figure. Closing the mold sections 30, 30 forms the blow mold cavity 33 for a paneled bottle 6 in the shape shown in FIG. 6.

In FIG. 5 the reference numeral 5 denotes stretch blow means shared by both the pre-blow mold 2 and the blow mold 3. The stretch blow means includes a blow core 52 attached downward to a lower surface of a mold fastener block 51 provided capable of elevating on the lift board 17. It also includes an stretch rod 54, which is inserted for movement up and down through an inner center opening of the blow core 52 and surrounded by an air distribution gap 53. The blow core 52 descends together with the mold fastener block 51 and fits in the neck mold 13. The stretch rod 54 is inserted after the blow core 52 is fit into the neck mold 13, and serves as a positioning rod for the preform 10 inside the pre-blow mold. It serves as the stretch rod inside the normal blow mold 3, which stretches and extends the preform 10 in the blow cavity to the mold surface of the bottom mold 32.

The following description is given of a method of molding heatproof bottles of polyethylene terephthalate (PET) in the above described mold device.

First, the preform 10 is injection molded. The injection cavity mold 1 and the injection core 16 are set at a temperature of 14-16° C. below the glass transition point. As for the neck mold 13, the temperature is not set particularly because it is cooled during contact via fastenings to the injection cavity mold 1.

When the temperature of the mold device reaches the set temperature, the neck mold 13 is caused to descend for mold closing with the injection cavity mold 1 and, almost at the same time or after the mold closing, the injection core 16 is inserted into the cavity for mold fastening to form the cavity 11 for preform molding. After completion of mold fastening, a resin of polyethylene terephthalate molten at a set temperature of 260-270° C. is injected from the injection nozzle 12 and charged into the cavity 11.

The molten resin charged into the cavity 11 is quenched in the cavity mold 11, the neck mold 13 and the injection core 16 set at the above described temperature and shaped into the preform 10 (see FIG. 2) with the neck, body and bottom integrated. The cooling time (a set time after completion of holding pressure) varies depending on the wall thickness of the preform body. In either case, though, it is limited to a mold releasable time (3-7 seconds) in which the inside of the body has not been cooled completely and is still in a high-temperature state such that semi-cured surface layers (skin layers) formed on the inner and outer surfaces retain the preform form.

A shorter cooling time than the time corresponding to the wall thickness results in insufficient semi-curing of the surface layers, which prevents extraction from the injection core and impairs the form of the preform 10 at mold release. In contrast, a longer one results in overcooling, which increases the thicknesses of the inner and outer surface layer regions to reduce the high-temperature region inside the body. The resultant lack of inner thermal energy results in insufficient heat softening of the outer surface layer after mold release. Therefore, even if pre-blowing is applied to adjust (the wall thickness and temperature of) the preform body (hereinafter simply referred to as the body) after mold release, followed by normal blow molding of bottles, the resultant eccentricity makes it difficult to mold heatproof bottles.

After the injection/cooling time elapses, the neck mold 13 and the injection core 16 are lifted such that the neck mold 13 releases the preform 10 from the cavity 11. Thus, the preform 10 is held in the air on the neck mold 13 as shown in FIG. 2 such that the transfer plate 14 can transfer it to the pre-blow mold 2.

Figure 9:
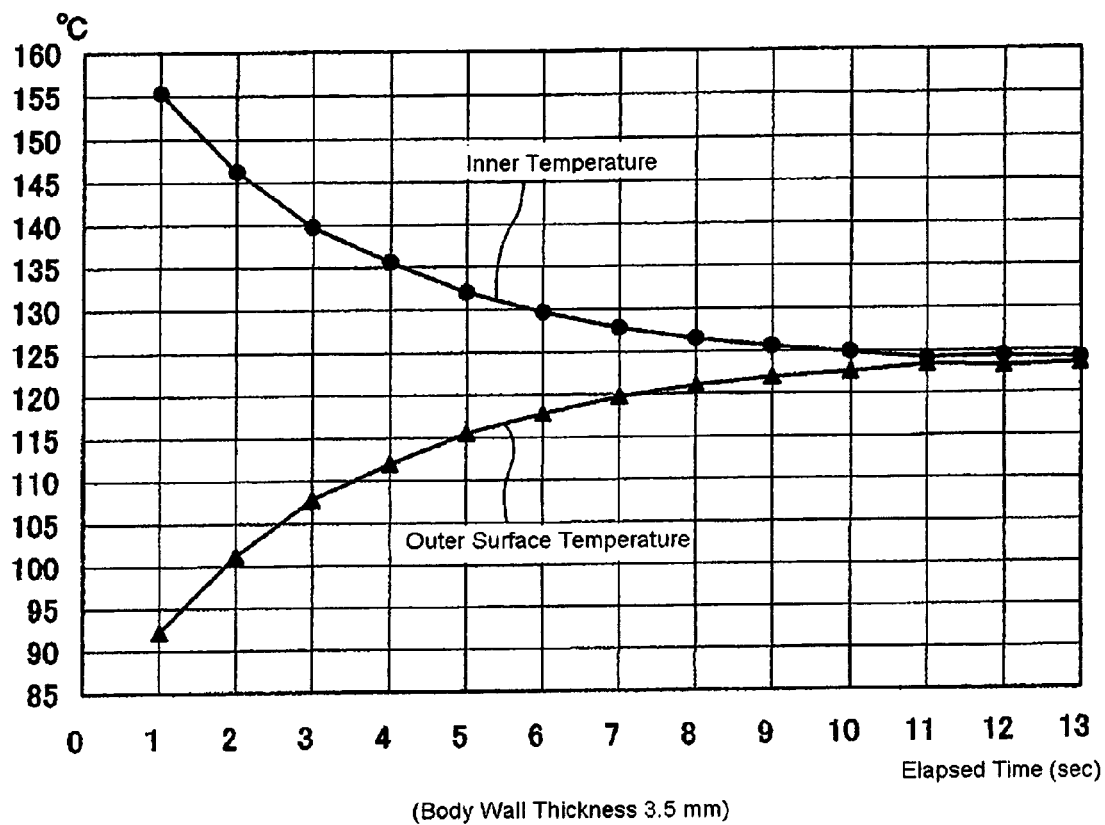
FIG. 9 provides graphs showing time variations in outer surface temperature and inner temperature of a body after mold release of the preform.
Figure 10:
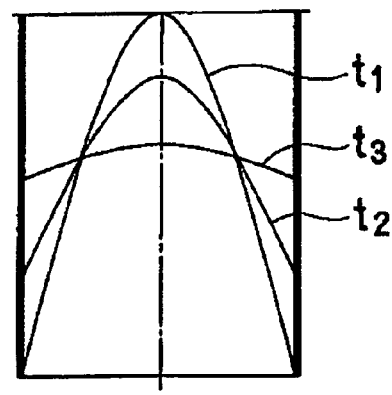
FIG. 10 is a diagram of temperature distributions across the body of the preform in section.

The mold-released preform 10 may be held on the neck mold 13 and left in the air. In this case, because the difference in inner and outer temperatures of the body wall is significant as shown in FIGS. 9 and 10, the outer surface is heated with the internal heat and the outer surface temperature sharply elevates until it reaches the peak. In a preform with a body wall thickness of 3.0-4.5 mm, the time immediately after mold release until the temperature reaches the peak is equal to or below 16 seconds and the outer surface temperature gradually descends past the peak.

Then, the mold-released preform 10 is immediately transferred together with the neck mold 13 onto the pre-blow mold 2 by the transfer plate 14 and subjected to pre-blowing after the injection cavity mold 1 and the neck mold 13 are closed together. In this case, the time until pre-blowing the preform 10 is restricted at 5±0.5 seconds after the mold release, and the temperature of the pre-blow mold 2 is set at a range of 110-117° C.

Pre-blowing comprises fitting the blow core 52 in the neck mold 13 from above before closing of the above mold sections 20, 20; inserting the stretch rod 54 through the blow core 52 to the preform bottom; and fixing the preform 10 in the pre-blow cavity after mold closing. It also comprises then air blowing previously described low-pressure air (of 1.4-1.7 MPa, for example) into the preform body from the blow core 52 for a short time (0.5-1.0 second).

The air blowing expands the body by a difference between the body outer diameter and the cavity inner diameter previously determined, thereby extending and thinning the body and removing the eccentricity caused on molding. In addition, the contact with the cavity surface heated at the above temperature suppresses radiation of heat from the outer surface and accumulates the amount of internal heat. Therefore, a certain migration of internal temperature arises in accordance with thinning of the body wall thickness and eliminates the temperature variation caused on preform molding.

Figure 7:
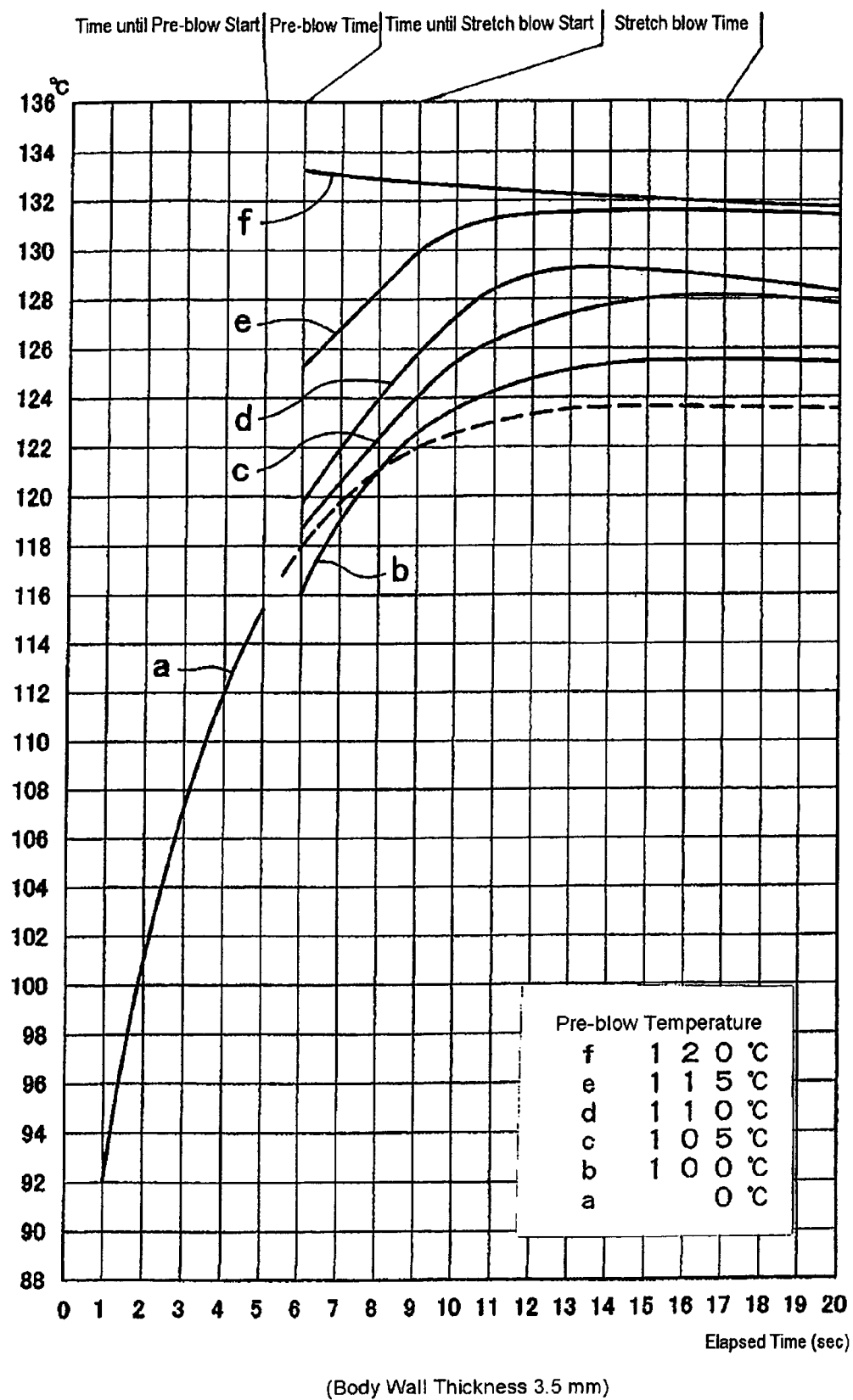
FIG. 7 provides graphs showing time variations in outer surface temperature of a preform with a wall thickness of 3.5 mm.
Figure 8:
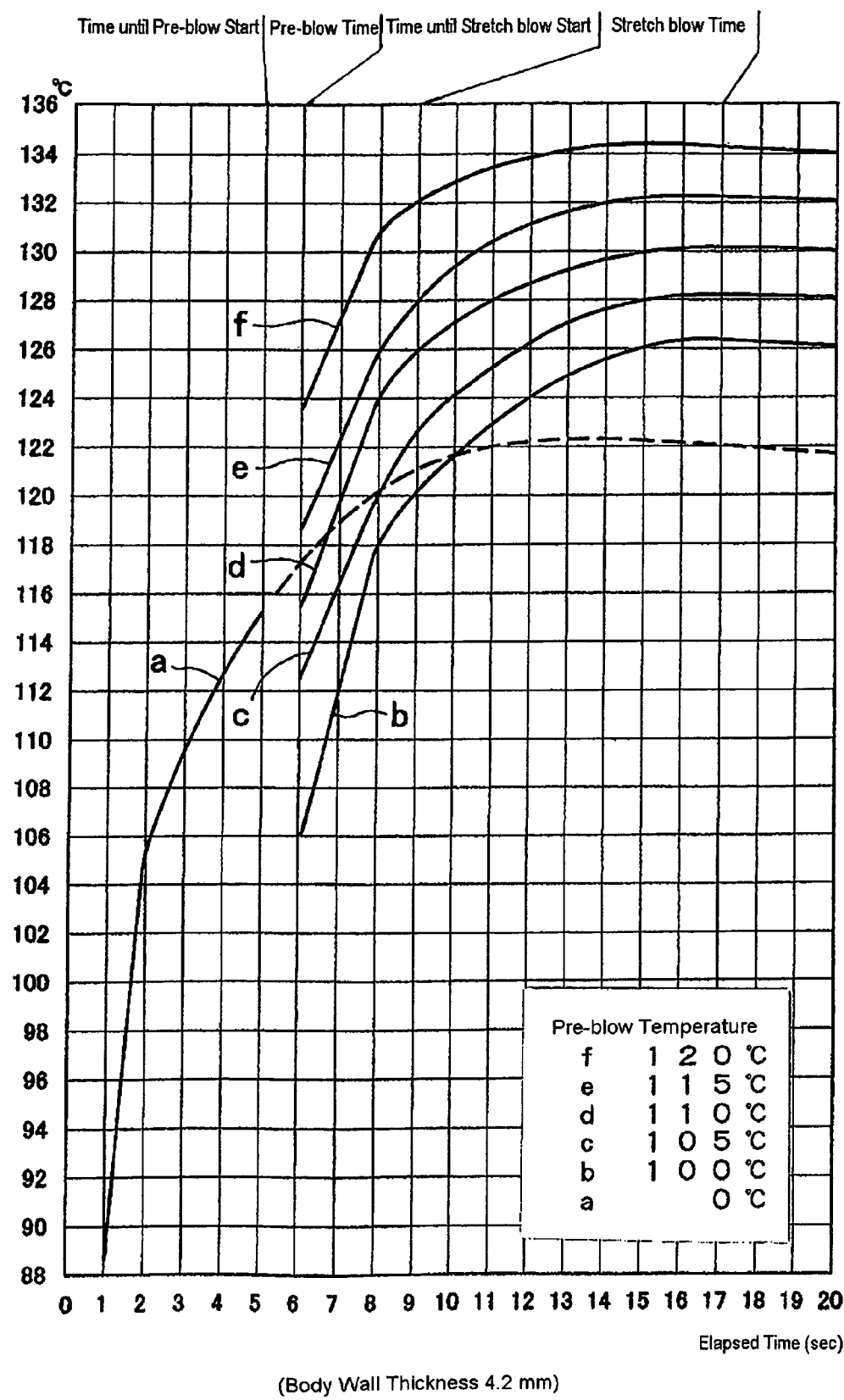
FIG. 8 provides graphs showing time variations in outer surface temperature of a preform with a wall thickness of 4.2 mm.

FIGS. 7 and 8 relate to two types of preforms with body wall thicknesses of 3.5 mm and 4.2 mm and show a time variation in outer surface temperature (a) in normal molding without pre-blowing and time variations in outer surface temperature (b-f) after pre-blowing. As obvious from the temperature graphs, the outer surface temperature serving as an index of stretch blow molding starts to sharply elevate at the time of extraction from the injection cavity mold 1 as it is heated by internal heat. As is found in the case without pre-blowing, however, the outer surface temperature slowly elevates at around 8-9 seconds after mold release and reaches the peak temperature. This is resulted from the reduction in the amount of internal heat by radiation of heat from the outer surface. Accordingly, for the body wall thickness of 3.0-4.5 mm, it is not possible to increase the peak temperature without external heating.

The set temperature of 105-117° C. in the pre-blow mold 2 is equal to or below the outer surface temperature at 5±0.5 seconds after the mold release (3.5 mm: 114-117° C., 4.2 mm: 114-116° C.) as can be seen from the temperature graph. During pre-blowing for 0.5-1.0 second, the set temperature retains warmth and suppresses radiation of heat from the outer surface, thereby reducing the loss in the amount of internal heat due to radiation of heat and accumulating heat by the amount of radiation. As a result, the outer surface temperature after pre-blowing rises higher than normal molding without pre-blowing and the peak temperature also rises higher.

Also at the set temperature of 100° C. the temperature after pre-blowing rises higher than normal molding without pre-blowing. In this case, though, even subsequent stretch blow molding achieves heat setting, it hardly changes the heat resistance compared with normal molding. At the set temperature of 120° C. the temperature after pre-blowing rises extremely and the body adheres to the blow cavity surface on stretch blow molding and leads to a molding failure. Setting the start time of pre-blowing at four seconds or less after mold release is difficult due to the restriction associated with the machine operating speed. In addition, the outer surface temperature is low and has a large temperature difference from the inside and accordingly the above effect exerted by pre-blowing cannot be expected. At six seconds or more after mold release, the outer surface and the inside have a small temperature difference therebetween and accordingly the effect on suppressing heat radiation exerted by pre-blowing can not be expected.

In the temperature graphs, the outer surface temperature after release from the pre-blow mold 2 is lower when the body wall thickness is 4.2 mm than when the body wall thickness is 3.5 mm. This is because the cooling time that enables mold release of the preform is set longer than when the wall thickness is 3.5 mm and the surface layer region is formed thicker.

After completion of pre-blowing, the mold sections 20, 20 are opened to mold-release the adjusted preform 10 such that the preform 10 is left between the opened mold sections 20, 20 and held on the neck mold 13. Next, the seat 41 is shifted laterally to switch between the positions of the mold sections 20, 20 and of the mold sections 30, 30 of the blow mold 3. As a result, the adjusted preform 10' locates together with the neck mold 13 at the center of the mold sections 30, 30. Accordingly, the adjusted preform 10 can be housed in the blow cavity 33 formed by subsequent mold closing.

Before closing of the blow mold 3, the blow core 52 is fitted in the neck mold 13 from above. The stretch rod 54 is then inserted into the adjusted preform 10 to the inner bottom and extended to the cavity mold for stretch mold fastening. On the other hand, high-pressure air (of 2.5-3.5 MPa, for example) is blown from the blow core 52 into the adjusted preform to expand the adjusted preform 10 fully within the cavity to form a bottle 6. The blowing is performed for a previously determined time (of 6-9 seconds, for example) to immediately heat set the body and bottom of the molded bottle 6. The heat setting makes the body and bottom of the bottle 6 resistive at a charging temperature of around 90° C. without deformation.

EXAMPLES

| | |
|---|---|
| Type of Use molding machine: | SBIII-250LS-50S from Aoki Technical Laboratory, Inc. |
| Material resin: | Polyethylene Terephthalate (PET) |
| Thermograph: | TVS-200 Infrared Thermography from Nippon Avionics Co., Ltd. |
| Molded product: | Heatproof bottle (round body-paneled, 500 ml) |
| Full height | 207 mm |
| Under neck length | 186 mm |
| Lateral body width | 68 mm |
| Body wall thickness (2 examples, body center average) | |
| (1) | 0.35 mm |
| (2) | 0.40 mm |
| Preform: | Full height 98 mm |
| Under neck length | 77 mm |
| Body outer diameter (center) | 23.9 mm |
| Body wall thickness (2 examples, average) | |
| (1) | 3.5 mm |
| (2) | 4.2 mm |

Hereinafter, the body wall thickness of 3.5 mm is referred to as (1) and the body wall thickness of 4.2 mm as (2).

| Molding condition (at room temperature of 19° C.) with temperature, time and pressure settings: | |
|---|---|
| Preform molding condition: | |
| Injection temperature | 260-270° C. |
| Mold temperature (cavity mold/core mold) | 16° C. |
| Charging/holding pressure time | (1) 7.2 sec, (2) 9.5 sec |
| Cooling time | (1) 3.5 sec, (2) 5.0 sec |
| Pre-blowing condition: | |
| Pre-blowing start time (after release from Injection mold) | 5.0 sec |
| Cavity inner diameter (center) | 24.9 mm |
| Mold temperature (° C.) | 105, 110, 115 |
| Blowing air pressure | 1.6 MPa |
| Blowing time | (1) 0.7 sec, (2) 0.8 sec |
| Stretch blow molding condition: | |
| Stretch blowing start time (after release from Pre-blow mold) | 3.2 sec |
| Mold temperature (° C.) | 103-107 |
| Stretch Magnification | |
| Vertical (axial) | 2.4 times |
| Lateral (radial) | 2.85 times |
| Blowing air pressure | 3 MPa |
| Blowing time | (1) 7.0 sec, (2) 8.0 sec |

| Outer surface temperature (A) after pre-blowing and Outer surface temperature (B) on stretch blow molding: | | | |
|---|---|---|---|
| Pre-blow mold temperature | | (A) | (B) |
| 105° C. | (1) | 118.8 | 122.3 |
| 110° C. | (1) | 119.6 | 123.9 |
| 115° C. | (1) | 125.2 | 128.4 |
| 105° C. | (2) | 112.5 | 120.1 |

-continued

| | | | |
|---|---|---|---|
| 110° C. | (2) | 115.4 | 124.1 |
| 115° C. | (2) | 118.7 | 125.9 |

(A): Temperature at 1.2 sec after pre-blowing
(B): Temperature at 3.2 sec after pre-blowing

[Results]

Example 1

Charging Temperature: 90° C.

| Pre-blow mold | Set temperature | 115° C. |
|---|---|---|
| Blow mold | Set temperature | 103° C. |

Volume change (ml) of bottles
after shape-stabilized (left for 14 days)

| | ICBC* | ICAC* | CD* |
|---|---|---|---|
| Body wall thickness (1) | 546.9 | 543.5 | −3.4 |
| Body wall thickness (2) | 548.3 | 545.8 | −2.5 |

ICBC* Inner capacity before charging
ICAC* Inner capacity after charging
CD* Capacity difference Example 2

Charging Temperature: 87° C.

Volume change (ml) same as above

| | ICBC | ICAC | CD |
|---|---|---|---|
| Body wall thickness (1) | 548.3 | 546.4 | −1.9 |
| Body wall thickness (2) | 547.3 | 546.4 | −0.9 |

Comparative Example 1

Charging Temperature: 90° C.

Normal molding (without pre-blowing)

| Blow mold | Set temperature | 103° C. |
|---|---|---|

Volume change (ml) same as above

| | ICBC | ICAC | CD |
|---|---|---|---|
| Body wall thickness (1) | 537.6 | 526.5 | −11.1 |
| Body wall thickness (2) | 537.9 | 521.3 | −16.6 |

Comparative Example 2

Charging Temperature: 87° C.

Normal molding (without pre-blowing)

| Blow mold | Set temperature | 103° C. |
|---|---|---|

Volume change (ml) same as above

| | ICBC | ICAC | CD |
|---|---|---|---|
| Body wall thickness (1) | 533.7 | 527.0 | −6.7 |
| Body wall thickness (2) | 535.8 | 528.0 | −7.8 |

As obvious from the comparisons of the above examples 1, 2 and the comparative examples 1, 2, capacity differences are smaller in the examples according to the invention than the comparative examples that execute no pre-blowing. The reduction in capacity is mainly due to thermal contraction of the bottle body by heating. Therefore, the PET bottle according to the invention with the smaller reduction in capacity after heat charging becomes a heatproof bottle that can resist thermal contraction more than the bottles according to the normal molding (comparative examples) of the prior art. In addition, it hardly causes thermal deformation because pre-blowing uniforms the wall thickness distribution and reduces the temperature difference between the inner center and the surface layer of the body.

What is claimed is:

1. A method of injection stretch blow molding heatproof bottles, comprising:

injection molding a bottomed preform by charging polyethylene terephthalate into an injection mold composed of an injection cavity mold and an injection core;

quenching the preform to a temperature below the glass transition point at the time of injection molding;

releasing the preform from both the injection mold and the injection core while surface layers inside and outside the body of the preform are semi-cured and the inside is still at a higher temperature in association with the cooling temperature and time;

putting the mold-released preform into a cavity in a pre-blow mold and expanding the preform by air blowing for pre-blowing to adjust the wall thickness and temperature of the body of the preform;

releasing the preform from the pre-blow mold and transferring the preform to a blow mold for bottle molding; and stretch blow molding the adjusted preform within a blow cavity in the blow mold by extending a stretch rod and blowing air to form a heatproof bottle with a thinner body, wherein the body wall thickness of the preform is limited within a range of 3.0-4.5 mm, wherein the adjustment of the preform by the pre-blowing is performed by expanding only the body and suppressing radiation of heat from an outer surface of the body and is started at a time of 5 ±0.5 seconds after release from the injection mold, at a temperature of 110-117° C. of the pre-blow mold, and for a pre-blowing time of 0.5-1.0 second, wherein the stretch blow molding of the bottle is started at a time of 3-4 seconds after the release from the pre-blow mold and performed by stretch blow molding the adjusted preform into the bottle, immediately followed by heat setting the body and the bottom with the blow mold to impart heat resistance to the bottle set at a temperature of 103-107° C. in the blow mold and for an air blowing time of 6-9 seconds, wherein the pre-blow mold comprises mold sections and includes a pre-blow cavity having a diameter 0.5-2.75 mm larger than an outer diameter of the preform body, and wherein the preform inside the pre-blow cavity is expanded by air blowing by a difference in diameter to reduce the eccentricity of the body wall thickness, and radiation of heat from the outer surface of the body by air-pressing the body of the preform against the pre-blow cavity surface is suppressed for 0.5-1.0 second.

2. The method of injection stretch blow molding heatproof bottles according to claim 1, wherein the pre-blowing is performed by blowing low-pressure air of 1.4-1.7 MPa, and the stretch blow molding is performed by blowing high-pressure air of 2.5-3.5 MPa.

* * * * *